(12) United States Patent
Hogan et al.

(10) Patent No.: US 6,947,364 B1
(45) Date of Patent: Sep. 20, 2005

(54) DETECTING TRACK JUMPS DURING READING OR WRITING OF DATA ON AN OPTICAL DISK

(75) Inventors: Josh Hogan, Los Altos, CA (US); Charles Robert Weirauch, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/570,807

(22) Filed: May 15, 2000

(51) Int. Cl.$^7$ ............................................. G11B 20/00
(52) U.S. Cl. ................................ 369/53.45; 369/30.24
(58) Field of Search ..................... 369/30.24, 53.45; 386/113, 66

(56) References Cited

U.S. PATENT DOCUMENTS

| | | | | |
|---|---|---|---|---|
| 5,012,461 A | * | 4/1991 | Yoshida et al. | 369/44.33 |
| 5,208,792 A | * | 5/1993 | Imanaka | 369/44.38 |
| 5,272,688 A | * | 12/1993 | Horiguchi | 369/99 |
| 5,491,676 A | * | 2/1996 | Yamaguchi et al. | 369/44.28 |
| 5,513,155 A | * | 4/1996 | Kim et al. | 369/30.15 |
| 5,677,935 A | * | 10/1997 | Karino | 375/368 |
| 5,754,522 A | * | 5/1998 | Kobayashi et al. | 369/275.3 |
| 5,848,050 A | * | 12/1998 | Nagasawa et al. | 369/275.4 |
| 5,917,782 A | * | 6/1999 | Kim et al. | 369/30.23 |
| 6,172,952 B1 | | 1/2001 | Inokuchi et al. | |
| 6,256,274 B1 | * | 7/2001 | Arataki et al. | 369/44.28 |
| 6,538,982 B1 | * | 3/2003 | Van Vlerken et al. | 369/275.4 |

FOREIGN PATENT DOCUMENTS

| | | | |
|---|---|---|---|
| JP | 10159746 | 8/1998 | |
| JP | 11066563 | 6/1999 | |
| WO | WO 98/10415 | * 3/1998 | ............ G11B 7/09 |
| WO | WO9810415 | 3/1998 | |

OTHER PUBLICATIONS

MAT (Machine assisted translation) of JP 11-066563.*
ECMA/TC31/99/7 ∴ 120mm ReWritable DVD(DVD+RW), cover pg, iii, 30, Feb. 1999.*

* cited by examiner

Primary Examiner—A M Psitos

(57) ABSTRACT

In use of an optical disk such as a Digital Versatile Disk (DVD) it is sometimes desirable to detect if a track jump occurs as quickly as possible after the occurrence. The optical disk format includes a pre-groove track structure which provides the frame work upon which data can be written to and read from the disk. The structure of the pre-groove track is utilized to detect the possible occurrence of an inadvertent track jump as soon as possible and in a time shorter than would be required to detect the track jump using only disk addressing data. The pre-groove track structure may be modified to enhance track jump detection, such as by positional codes in data line Segments of the track, or revolving coding schemes for the addressing data dibits.

14 Claims, 3 Drawing Sheets

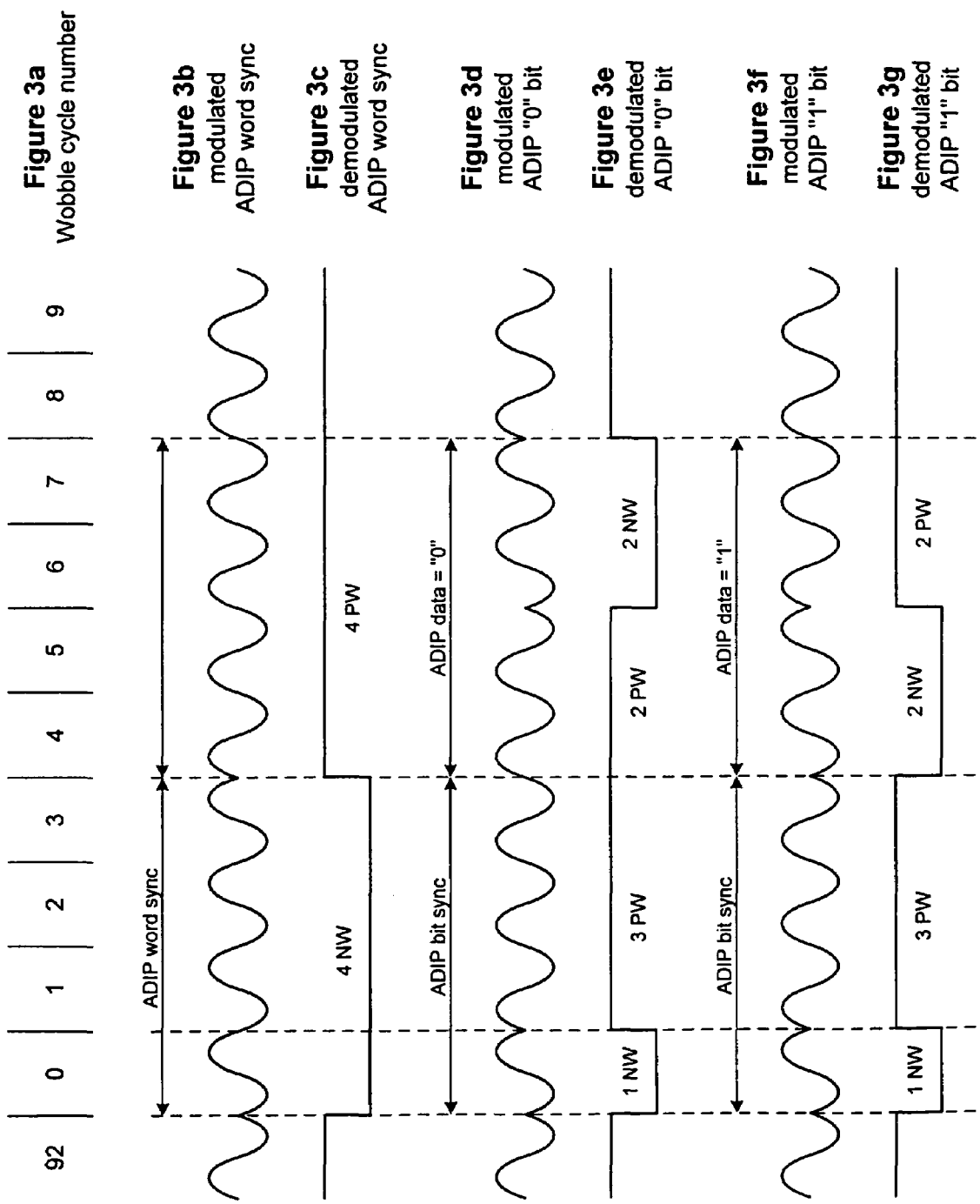

DETECTING TRACK JUMPS DURING READING OR WRITING OF DATA ON AN OPTICAL DISK

FIELD OF THE INVENTION

The present invention relates to the field of track jump detection during reading and/or writing of an optical disk.

BACKGROUND OF THE INVENTION

When reading or writing data with an optical disk data recorder drive, such as DVD+RW, there is the possibility of having an inadvertent track jump due to mechanical or other disturbances. An optical disk such as a digital versatile disk (DVD) or compact disk (CD) is typically formatted with tracks formed from a single spiral groove, with each track being considered a 360 degree turn of the spiral. The tracks provide a framework for writing data onto the disk and reading data therefrom. When reading data, for example, a read head is aligned with a desired track of the disk and the data on that track is sensed as the disk rotates past the head. A track jump can be considered as relative displacement of the read/write head from the desired track. Track jumping occurs as a matter of course during operation of an optical disk, to move the read/write head from one disk location to another. Intentional track jumps under control of the disk drive controller typically involve accurate positioning of the read/write head in relation to the disk surface so that the head aligns with another known track at a known time. An unintentional track jump can occur, for example, when a mechanical disturbance of the disk drive causes the read/write head to lose alignment with the desired track of the disk at an unpredictable time and by an unknown radial displacement. Because the timing and displacement from the desired track is unintentional, the disk drive controller can be unaware that the desired track alignment has been lost and the controller may be unable to determine what displacement has occurred in order to correct or compensate for it.

If data is being written to a disk when an unintentional track jump occurs, this can have the undesired effect of overwriting of data on the disk track to which the read/write head has jumped. Accordingly, it is desirable to provide means by which a track jump can be detected. In particular, it is desirable to be able to detect the occurrence of such a jump in a time sufficiently short that the amount of good data that is unintentionally overwritten is sufficiently small to be recovered by a data error correction scheme.

Protection against inadvertent track jumps can be particularly relevant in portable data storage/retrieval applications, such as a camcorder, where there may be mechanical noise and frequent deliberate track jumps to avail of variable bit rate recording. In a less critical situation, track jump detection is valuable in portable data reading applications. A possible situation (for illustrative purposes) would be a many-hour long compilation of MP3 music titles, recorded on a (8-cm) DVD+RW disc. Accurate track jump detection in that case can reduce the likelihood of interruptions to the music during playback, and could also reduce the amount of data buffering which is employed between the read head and the output. A player could avail of the wobble addressing information to detect and correct inadvertent track jumps, and this may help compensate for the lower data signal available from phase change discs.

SUMMARY OF THE INVENTION

In accordance with the principles of the present invention, there is provided a method for detecting inadvertent track jumps during reading or writing an optical disk, the optical disk being formed with a track having a detectable structure within which data is read or written during use of the optical disk. The method includes detecting a feature of the track structure of the optical disk at which data is read from or written to during data reading or writing of the disk. The detected feature of the track structure is then compared with an expected track structure feature. Then, a potential track jump occurrence is flagged in the event of a negative comparison between the detected track structure feature and the expected track structure feature.

In accordance with the present invention there is also provided a system for detecting inadvertent track jumps during reading or writing an optical disk, the optical disk being formed with a track having a detectable structure within which data is read or written during use of the optical disk. The system includes an optical read/write head capable of detecting a feature of the track structure of the optical disk at which data is read from or written to during data reading or writing of the disk. The system further includes an optical disk drive controller coupled to the read/write head, that controls writing and reading of data to and from the optical disk by way of the read/write head. The optical disk drive controller compares the detected feature of the track structure with an expected track structure feature, and flags a potential track jump occurrence in the event of a negative comparison between the detected track structure feature and the expected track structure feature.

Preferably the data reading or writing operation with the disk is ceased in the event of a potential track jump being flagged.

In the preferred embodiments of the invention, the track structure comprises a track wobble. In some preferred implementations of the invention, the track structure includes addressing information encoded therein in addressing units, and the optical disk track is arranged in a series of data line segments with the track structure for each data line segment having a synchronization unit and an addressing unit.

In one particular form of the invention, the detected feature of the track structure comprises a wobble encoding structure of the addressing unit for at least one data line segment. The addressing unit, for example, can be encoded differently for adjacent data line segments.

In another form of the invention the optical disk track is further arranged in a series of data block segments each comprising a series of successive data line segments, wherein the detected feature of the track structure comprises a wobble encoding structure that is different as between each of the adjacent data block segments. The wobble encoding structure may comprise at least one inverted wobble for in each data line segment, wherein the position of the at least one inverted wobble is different for data line segments of different data block segments.

In another form of the invention the detected feature of the track structure comprises a timing of the occurrence of the synchronization unit of at least one data line segment.

In another form of the invention the detected feature of the track structure comprises an abrupt and sustained change in track wobble phase.

In accordance with the present invention there is further provided an optical disk constructed to enable detection of inadvertent track jumps during reading or writing. The optical disk is formed with a pre-groove track having a detectable structure within which data is read or written during use of the optical disk. The pre-groove track structure includes addressing information encoded therein in addressing units, with the pre-groove track arranged in a series of data line segments and the track structure for each data line segment having a synchronization unit and an addressing unit. The pre-groove track is further arranged in a series of data block segments each comprising a series of successive data line segments. The detected feature of the track structure comprises a wobble encoding structure that is different as between each of the adjacent data block segments. This allows a disk drive controller, in use of the disk, to detect a potential disk track jump by comparing the detected feature of the track structure with a predetermined expected track structure feature, wherein if the two are different occurrence of a potential inadvertent track jump is indicated.

Using some or all of the techniques of the invention disclosed herein can reduce the probability of a track jump occurring in a manner that is undetectable within a distance too long for ECC recovery. These techniques may be coupled with other processing, such as detecting deviations from the predicted address bits (based on the previous address sequence), to reduce undesirable consequences of inadvertent track jumps.

BRIEF DESCRIPTION OF THE DRAWINGS

The invention is described in greater detail hereinafter, by way of example only, through description of a preferred embodiment thereof and with reference to the accompanying drawings in which:

FIG. 3 is a timing diagram illustrating an addressing information format for a DVD.

DETAILED DESCRIPTION OF THE PREFERRED EMBODIMENT

A method and apparatus for track jump detection during reading and/or writing of an optical disk is disclosed herein. In the following description, for purposes of explanation, specific nomenclature and specific implementation details are set forth to provide a thorough understanding of the present invention. However, it will be apparent to one skilled in the art that these specific details are not required in order to practice the present invention. For example, the preferred embodiment is described in the context of DVD+RW disks, but the techniques of the invention are equally applicable to other forms of optical disks.

As mentioned above, data is stored on a typical optical disk having reference to tracks which are formed on the disk during manufacture. The spiral track formed on the disk at the time if manufacture is sometimes referred to as a pre-groove. In the case of a digital versatile disk (DVD), for example, the tracks are formed from a single spiral groove, with each track being considered a 360 degree turn of the spiral. The track pitch, which is the distance between the average track centerlines of adjacent tracks measured in the radial direction, is 0.74 micrometers.

In order to enable the disk drive controller to determine which track the read/write head is aligned with, the tracks are structured so that addressing information can be obtained therefrom, separate to the data which may be associated with the tracks. On a DVD the tracks are formed with a cyclic radial perturbation, which is nominally a sinusoidal deviation from the true spiral path of the track. This track path deviation is referred to as a wobble, and each sinusoidal cycle is called a wobble cycle. The addressing information of the optical disk tracks is conveyed by phase modulation of the wobble, which is can be detected and decoded by the disk drive controller.

In the DVD standard, data is organized into blocks according to an error correction code (ECC) scheme, so that data recovery is possible if data in the block becomes corrupted. An error correction block contains 32k bytes of data and the ECC scheme is capable of recovering a burst error of magnitude a little over 2k bytes. The correspondence between the data which is written on the disk and addressing information encoded in the track wobbles is such that addressing information is available to the disk drive controller four times over the duration of reading or writing one EC data block.

Figure 1:
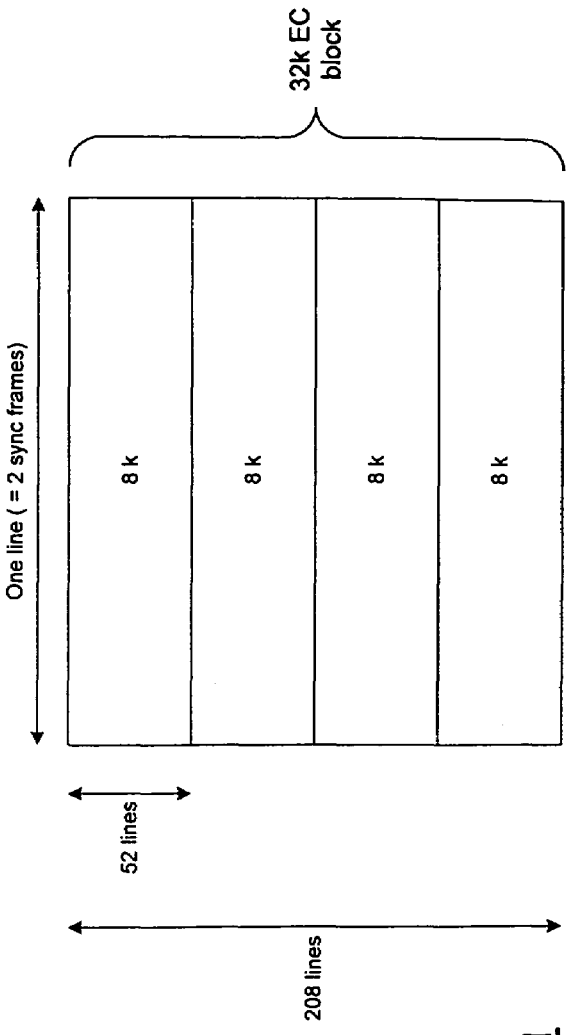
FIG. 1 is a conceptual diagram of a data block format for a DVD.

FIG. 1 is a conceptual block diagram of an error correction data block for a DVD+RW format. The data block as shown contains 32 kilobytes of data organized into 208 lines. Each line comprises two sync frames, wherein each sync frame has a synchronization header followed by data. Each sync frame when stored on the disk comprises 1488 channelbits (channelbits are the elements by which, after modulation, the binary values "0" and "1" are represented). Addressing information (Address-in-Pregroove or ADIP) is represented by the disk tracks on the basis of one bit of addressing information for each line of stored data. Each ADIP word comprises 52 ADIP units, with the first being utilized as an ADIP word synchronization header. Therefore, addressing information is repeated four times over the 208 line span of one 32k EC data block, so that a single ADIP word is distributed along a portion of disk track which holds one quadrant of a data block (8k of stored data).

Using the above described location addressing format, it is apparent that at least 8k of data will pass the read/write head of the optical disk drive in the time required for the controller to ascertain the location address of the head on the disk. Thus, if an unintentional track jump were to occur during a write operation, for example, at least one quadrant of data would be written on an unintended track before the disk drive controller could ascertain the track address and determine that the head is aligned with the wrong track. If that track already contained data which was overwritten following the track jump then at least 8k of that data would be overwritten before the track jump could be detected by observing the ADIP information. This amount of data cannot be recovered using the ECC scheme.

In view of the foregoing, in order for track jump detection to be most effective, the track jump should be detectable by the disk drive controller in less than the amount of time during which it takes to write the largest amount of data which is recoverable by the error correction scheme. In the above example, that is 2k bytes.

Figure 2:
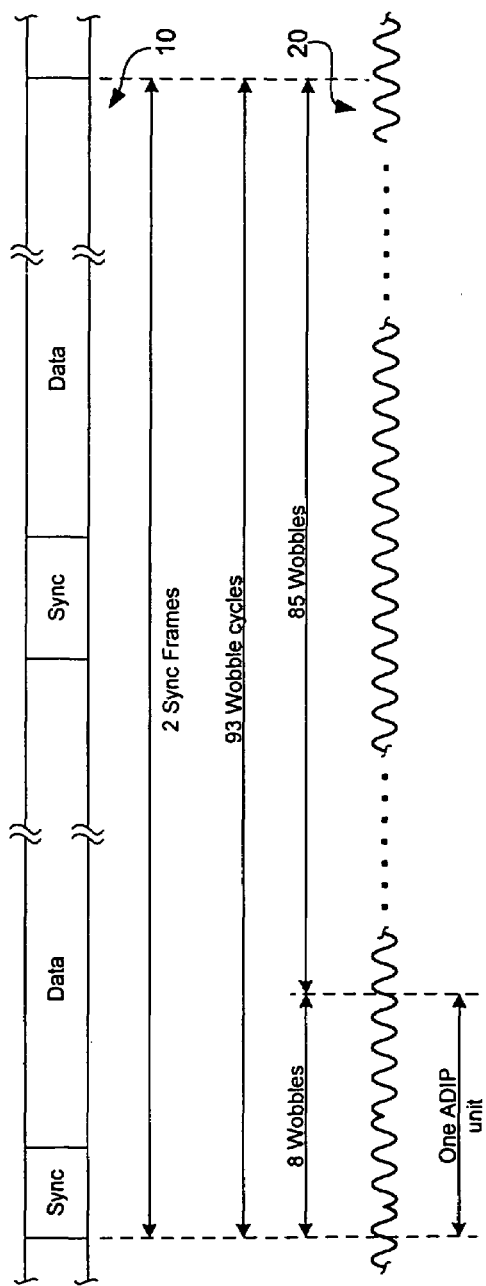
FIG. 2 is a block diagram illustrating a relationship between stored data and track addressing information for a DVD.

FIG. 2 is a simplified block timing diagram which illustrates the relationship between data stored on a DVD+RW optical disk and the addressing information that is contained in the wobbled track structure thereof. One line of data is indicated at 10 in the figure in block diagram form, comprising two sync frames each having a sync header followed by data. The length of the optical disk track along which one line of data is stored has 93 wobble cycles, and the wobbled track structure is indicated in the figure at 20. Each wobble corresponds to 32 channelbits of data stored on the track. In a proposed DVD+RW standard format the ADIP addressing information is contained in the first 8 wobble cycles of the track corresponding to each data line 10. The 8 wobble cycles convey one ADIP unit, which is one bit of addressing information. As mentioned 52 ADIP units make up one ADIP word, which is one unit for synchronization and 51 for address. The remaining 85 wobble cycles along each data line do not carry addressing information but are utilized by the disk drive controller for timing purposes.

FIG. 3 is a diagrammatic timing diagram illustrating the way in which addressing information is coded into the wobble cycles of the first 8 wobbles of a 93 wobble length of track corresponding to one data line. The wobble cycle numbering is shown in FIG. 3a, beginning at #92 which is the final wobble cycle from a previous line, followed by cycles #0 to #9 from the line under consideration. FIG. 3b represents the wobble cycle modulation for the first unit in an ADIP word, which is a special synchronization unit that identifies the beginning of an EC data block quadrant. FIG. 3c illustrates the demodulated signal for the ADIP word sync. The wobble structure and demodulated signal for an ADIP unit representing a binary "0" is shown in FIGS. 3d and 3e, respectively. Similarly, the wobble structure and demodulated signal for an ADIP unit representing a binary "1" is shown in FIGS. 3f and 3g.

The coding of ADIP data in the wobble of the track is achieved by phase modulation of the wobble, by inverting certain wobble cycles in the first eight. The wobble of the pre-groove track is nominally sinusoidal with a phase which is herein referred to as a positive wobble (PW) phase. For example, if the 85 wobbles not used for addressing carry no information then they are all of the same PW phase. Referring to FIG. 3, it can be seen that the first cycle of each ADIP unit (cycle #0) is always an inverted cycle, referred to as a negative wobble or NW. In the case of an ADIP word sync unit (FIGS. 3b and 3c) cycles #1 to #3 are also inverted, NW, cycles, which indicates the beginning of an EC data block quadrant. The remaining four cycles of the ADIP word sync unit are PW cycles.

For the ADIP bit units the first NW cycle is followed by three PW cycles, and together the first four cycles constitute an ADIP bit sync. Then, the remaining four wobble cycles are used to convey the addressing data, either a binary "0" or a binary "1". For a binary "0" (FIGS. 3d and 3e) cycles #4 and #5 are PW phase and cycles #6 and #7 are NW phase. For a binary "1" (FIGS. 3f and 3g) the pattern is reversed, with cycles #4 and #5 of NW phase and cycles #6 and #7 PW phase. The remaining 85 wobble cycles (cycles #8 to #92) are not allocated for data coding and are nominally all PW phase, as mentioned above.

Fifty-two ADIP units are grouped into each ADIP word. The information contained in the ADIP bit units is as follows:

Bit 0: this bit contains no valid bit modulation and is used for synchronization. The content is interpreted as binary "0".

Bit 1: this bit is reserved and is set to binary "0".

Bits 2 to 23: these 22 bits contain a physical address. Data bit 2 is the most significant bit and data bit 23 is the least significant bit. The addresses increase by one for each next ADIP word.

Bits 24 to 31: these 8 bits can be used to contain auxiliary information about the disk.

For example, bits 24 to 31 from 256 consecutive ADIP words can form one ADIP frame with 256 bytes of physical format information relating to the disk.

Bits 32 to 51: these 20 bits contain error correction parities for the ADIP information.

For the purposes of ADIP error correction the 52 ADIP bits are grouped into thirteen 4-bit nibbles. Five parity nibbles N8 to N12 contain the ADIP bits 32 to 51, which are determined from the nibbles N0 to N7 (containing ADIP bits 0 to 31) according to a nibble-based Reed-Solomon (13,8,6) error correction coding scheme.

When data is stored on the optical disk various forms of encoding can be employed, for example to allow the most reliable data recovery during a read operation. A DVD+RW format optical disk retrieves stored data using edge detection which operates more reliably with limitations on the number of consecutive binary "0"s and "1"s in the recorded channel bits. To achieve the desired limitations, a run length limitation coding scheme is employed, such as an Inverted Binary Extended Hamming (IBEH) code. Such coding can, for example, convert an 8 bit data word into a 16 bit code word in a predetermined way so that the binary representation of the code word, and any possible concatenation of code words, meets the run length limitations. Various different coding "states" can be used to achieve the run length limitations, wherein each 8 bit data word can be coded into several different 16 bit code words depending upon the coding state. The coding state can be changed from one data word to the next in a predictable way to meet the run length limitations.

Having described the format of an optical disk storage system using the DVD+RW as an example, it is easier to describe the track jump detection schemes according to embodiments of the invention, several of which are explained below as examples.

In the DVD+RW re-writable format, address information is encoded as a phase-modulated high frequency wobbled groove. This address information is available four times per 32k data block and is distributed over each quadrant. However, since a quadrant consists of 8k bytes of data, relying on address detection to detect an inadvertent track jump could result in an overwrite burst error that is too long to be recovered by the ECC. Accordingly, it is desirable to provide at least one scheme for detecting the occurrence of an inadvertent track jump within a time period or disk track length that is within the capability of the error correction scheme. In the case of the DVD+RW format, a track jump should be detectable within a time period or track length that is less than the time period or track length within which 2k bytes of data can be written following the occurrence of the jump. In the preferred forms of the invention, the wobbled pre-groove is used for the track jump detection.

In a first form of the invention, the wobble cycles of the pre-groove which are not used by the ADIP addressing information can be encoded with additional data which allows reliable track jump detection. As described in relation to FIGS. 1 and 2, each line of data corresponds to 93 wobble cycles of the pre-groove, and eight of the wobble cycles are used to represent one ADIP unit per line. Thus, the additional data for track jump detection can be encoded into the remaining 85 wobbles along the data lines on the disk. It will be appreciated by those skilled in the art, however, that it is preferable to not encode too much information in the wobbled pre-groove track so that decoding of the wobble cycle information is reliable. For example, because wobble cycle information is represented by inverting certain wobbles, if a large amount of information is encoded then many wobbles will be inverted and the decoder may have difficulty synchronizing with the pre-groove and/or have difficulty determining which is the positive wobble phase and which is the negative wobble phase.

One way in which the unused wobbles can be employed for track jump detection is to invert one or more selected wobbles of the 85 unused wobbles along each data line, wherein the wobble(s) that are inverted are different for adjacent tracks. In other words, at least one of the unused wobbles is inverted in a selected pattern such that, for nearby tracks on the disk, the inverted wobble(s) occurs in a different position along a data line (as compared to the ADIP bit sync). Then, if an inadvertent jump occurs from one track to a nearby track, the disk controller can detect that the position of the inverted wobble has changed in an unpredicted way, which is taken to indicate a possible track jump.

One possible implementation of this form of the invention involves adding an inverted wobble in the unused portion of each data line, wherein the location of the inverted wobble in relation to the ADIP bit sync is different for successive data blocks. A single 32k byte data block extends over a little more than one half of a disk track at the inner circumference of the disk writable area. If all of the 85 unused wobbles were employed for the track jump detection scheme with a single inverted wobble, then the minimum number of tracks which must be jumped for the resulting track to have the same inverted wobble position as the original is about 42. This makes it very unlikely that a track jump could occur wherein the inverted wobble position before and after the jump matches, enabling reliable detection of track jumps. It make be useful for the purposes of easier binary calculations to instead have the inverted wobble position or pattern repeat every 16 or 32 data blocks, which still enables accurate track jump detection.

Of course it will be recognized by those skilled in the art that this technique is not limited to simply inverting a single wobble of varying position for each data block. Various other patterns of inverted wobbles could alternatively be used employing one or more inverted wobbles, bearing in mind the desirability of leaving the unused wobbles in the same state as much as possible for synchronization of the decoder. It will also be appreciated that it is not necessary that the inverted wobble coding for track jump detection be changed at data block boundaries, although the data blocks represent a convenient unit for that purpose.

Figure 4:
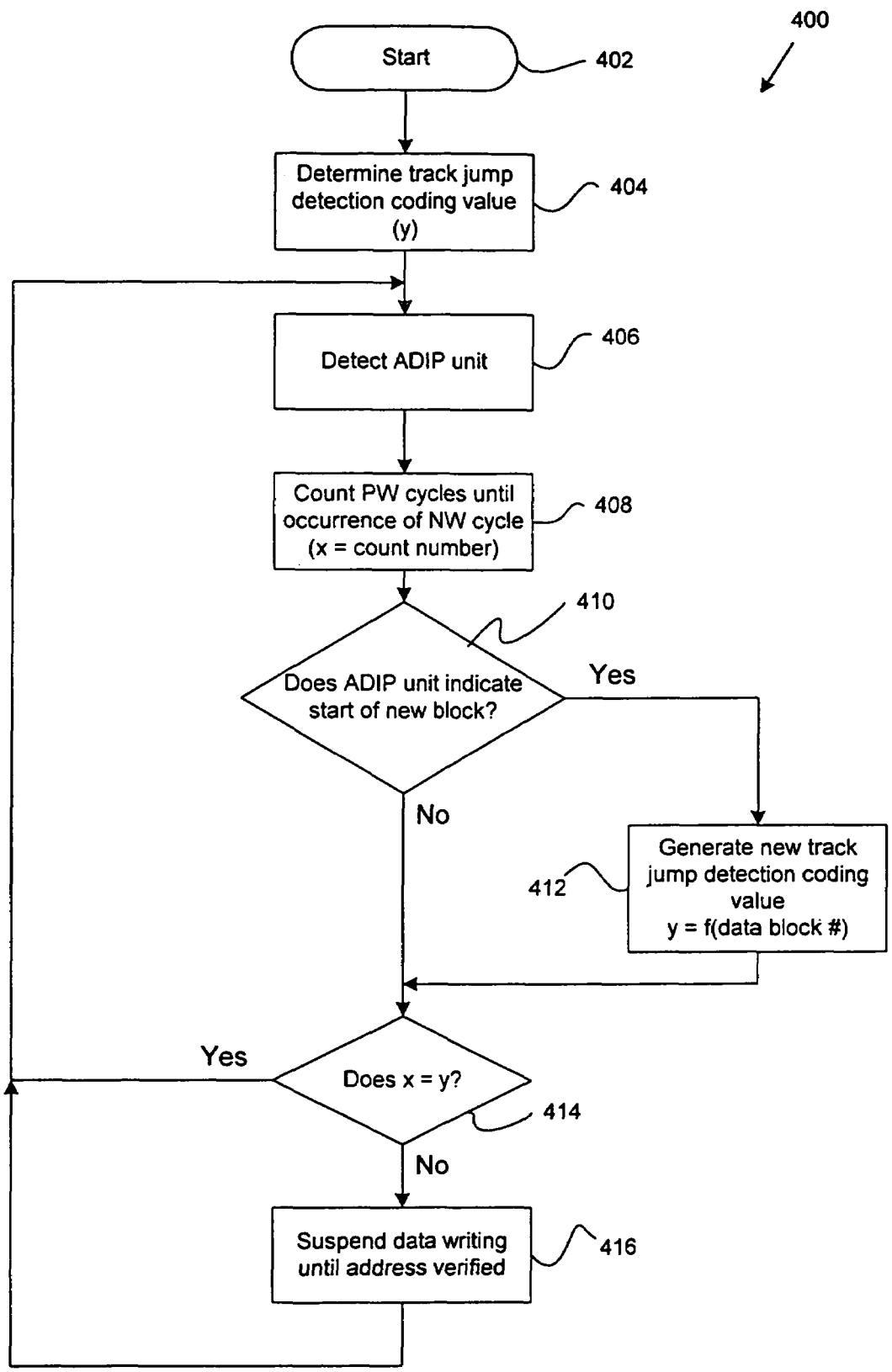
FIG. 4 is a flow chart diagram of an exemplary procedure for track jump detection in accordance with an embodiment of the present invention.

FIG. 4 is a simple flow chart diagram illustrating an example of a track jump detection procedure 400 based on the above described technique. The flow chart procedure 400, beginning at step 402, relates to writing of data on an optical disk, which is the most critical for track jump detection. A track jump detection value y is determined at step 404, for example representing the position of an inverted wobble cycle corresponding to the data block being written. During the data writing procedure, the ADIP unit at the beginning of each data line is detected at step 406. Following the ADIP unit, the remaining 85 wobble cycles for the line are nominally PW phase cycles. The number of PW cycles (x) following the ADIP unit are counted (step 408) until a NW cycle is detected. The NW cycle is the inverted wobble inserted for the purposes of track jump detection (or possibly an unexpected NW cycle of an ADIP unit if a track jump has occurred). If the ADIP unit detected at step 406 indicates the beginning of a new data block (step 410), then it is necessary to compute what the track jump detection code y for that block should be. The new track jump detection code is generated at step 412 according to a predetermined function, e.g. y=$f$(data block #). In the simplest case it may be that is simply determined from the data block number, modulo 16 or 32, although other functions will be apparent to those skilled in the art. At step 414, then, the measured cycle count x is compared to the track jump detection code y for the current block to which data is intended to be written. If the parameters x and y match each other, this is taken as an indication that the correct data block is being written to, i.e. the situation is normal. If, on the other hand, the parameters x and y do not match then a possible track jump incident is indicated. In that case, the writing of data is suspended immediately (step 416) so that if a track jump has occurred the amount of data written erroneously is minimized. The data writing is suspended until the data address on the disk is verified by the disk controller and the correct track portion located if necessary.

Another technique which can be employed for track jump detection in accordance with an embodiment of the present invention involves the coding of the dibit which is used in the ADIP units. As shown in FIG. 3 and described hereinabove, addressing information is conveyed by phase modulation of the pre-groove wobble using the first eight wobble cycles of the track for each data line. The first four wobbles of each ADIP unit are used for word or bit synchronization, and the remaining four wobbles are used to represent a single bit of addressing information. The four wobble cycles used for addressing information are modulated (as shown in FIG. 3) as two PW followed by two NW to represent a data "0", and two NW followed by two PW to represent a data "1". This coding is sometimes referred to as a dibit. Because four wobble cycles are used to represent one addressing data bit, the inherent redundancy in the coding can be exploited for track jump detection.

In order to enable detection of track jumps, different versions of the dibit can be used for different data lines. For example, the standard dibit is defined as four cycles with the second pair of opposite polarity to the first pair. An alternate version of the dibit would be four cycles with the second and fourth cycles of opposite polarity to the first and third. Another dibit coding would be to have the first and fourth cycles of opposite polarity to the second and third. By coding the dibit differently on adjacent data lines, the coding pattern for each ensuing data line being predetermined and therefore predictable by the disk controller, it is possible to detect a possible track jump when the dibit coding detected from the disk does not match the coding predicted by the disk controller.

Using this technique, if only one data line is considered then the likelihood of successfully detecting a track jump may be only two in three, where the three alternate dibit codings are employed. However, if the dibit coding is varied along a sequence of lines in a more complex pattern than simply alternating dibit versions, and more than one data line is examined, the likelihood of successful track jump detection is increased. Further, this technique can be combined with other track jump detection techniques disclosed herein to increase track jump detection reliability.

Another track jump detection technique of the present invention utilizes the ADIP sync wobble cycles. At the beginning of each data line (see FIGS. 1 to 3), the first wobble is always an inverted (NW) cycle. The regular occurrence of this NW cycle every 93 wobbles along the disk track can be used as a form of horizontal flywheel lock. During normal operation the disk controller can expect to detect the NW sync cycle at a predictable interval. However, if a track jump occurs, the likelihood is small that the resulting track position will match the horizontal flywheel lock of the previous track. Therefore, if several data lines in succession are read or written without the NW sync cycle occurring at the time predicted by the disk controller, this may be taken as an indication of a possible track jump.

As mentioned previously, the unused wobble cycles along the track which are nominally all of the same phase are used by the disk controller to generate a synchronized clock signal which can then be used to detect the modulated wobbles. However, if a track jump occurs it is unlikely that the track wobble at the resulting position will match the phase of the track wobble at the previous position. Therefore, if an abrupt and sustained phase discontinuity in the recovered clock is detected, this may also be taken to indicate the possible occurrence of an unintended track jump.

Several different track jump detection techniques have been disclosed hereinabove, utilizing the pre-groove track structure of an optical disk. It will be appreciated by those skilled in the art that the described techniques may be employed in isolation, or may be used in conjunction with one another for enhanced reliability of detection. The aim of the preferred techniques is to allow detection of a possible track jump as quickly as possible so that, for example, writing of data can be suspended before an unrecoverable position is reached. An unrecoverable position could be considered the overwriting of existing data, for example, to an extent that is not retrievable through error correction procedures (ECC). Using some or all of these techniques can reduce the probability of a track jump occurring in a manner that is undetectable within a distance too long for ECC recovery. These techniques may also be coupled with other processing, such as detecting deviations from the predicted address bits (based on the previous address sequence), to reduce undesirable consequences to inadvertent track jumps.

The foregoing detailed description of the present invention has been presented by way of example only, and it is contemplated that changes and modifications may be made by one of ordinary skill in the art, to the materials and arrangements of elements of the present invention without departing from the scope of the invention. For example, various specific procedural steps and details of parameter values have been described in conjunction with preferred embodiments, but of course alternative steps and parameters may be equally applicable and may be functionally equivalent for the purposes of carrying out the present invention.

What is claimed is:

1. A method for detecting inadvertent track jumps during reading or writing of data on an optical disk, the optical disk being formatted with tracks within which data is read or written and arranged in data lines, the method comprising:
   detecting a track jump using information in a non-addressing information portion of a data line, wherein:
      each data line is comprised of a portion containing addressing information for data and a portion containing non-addressing information, the non-addressing information portion being comprised of a plurality of wobble cycles and at least one inverted wobble cycle;
   the detecting comprising:
      determining a position of an inverted wobble cycle in the non-addressing information portion of a data line;
      comparing the determined position with an expected position of the inverted wobble cycle; and
      determining that the determined position does not match the expected position; and
   ceasing the reading or writing of data on the optical disk, wherein the detecting and ceasing are performed using information relating to only one inverted wobble cycle.

2. The method of claim 1 wherein adjacent data lines contain different non-addressing information.

3. The method of claim 2 wherein:
   each data line is comprised of a plurality of wobble cycles; and
   the at least one inverted wobble cycle in an non-addressing information portion is in a different position in the non-addressing information portion for adjacent data lines.

4. The method of claim 3 wherein:
   the addressing information of a data line is contained in the first eight wobble cycles of the data line; and
   the non-addressing information of the data line is contained in the remaining wobble cycles of the data line, the remaining wobble cycles having at least one inverted wobble cycle.

5. The method of claim 1 wherein:
   data of the optical disk is arranged in a plurality of data block segments, each data block segment being comprised of a plurality of data lines; and
   data lines of adjacent data block segments contain different non-addressing information.

6. The method of claim 5 wherein:
   each data line is comprised of a plurality of wobble cycles; and
   the at least one inverted wobble cycle in an non-addressing information portion is in a different position in the non-addressing information portion for data lines of adjacent data block segments.

7. The method of claim 6 wherein the detecting step further comprises:
   after determining a position of an inverted wobble cycle in the non-addressing information portion of a data line, determining that the addressing information portion of the data line indicates the beginning of a data block segment; and
   calculating an expected position of the inverted wobble cycle for the particular data block segment using a predetermined function.

8. A system for detecting inadvertent track jumps during reading or writing of data on an optical disk, the optical disk being formatted with tracks within which data is read or written and arranged in data lines, the system comprising:
   an optical head capable of reading or writing data on an optical disk;
   an optical disk drive controller coupled to the optical head for controlling the reading and writing of data on the optical disk by way of the optical head, wherein the controller detects a track jump using information in a non-addressing information portion of a data line and ceases the reading or writing of data on the optical disk, wherein:
      each data line of a track is comprised of a portion containing addressing information for data and a portion containing non-addressing information, the non-addressing information portion being comprised of a plurality of wobble cycles and at least one inverted wobble cycle; and
   the controller detects the track jump by:
      determining a position of an inverted wobble cycle in the non-addressing information portion of a data line;

comparing the determined position with an expected position of the inverted wobble cycle; and determining that the determined position does not match the expected positions wherein the controller detects the track jump and ceases the reading or writing of data using information relating to only one inverted wobble cycle.

9. The system of claim 8 wherein adjacent data lines contain different non-addressing information.

10. The system of claim 9 wherein:

each data line is comprised of a plurality of wobble cycles; and the at least one inverted wobble cycle in an non-addressing information portion is in a different position in the non-addressing information portion for adjacent data lines.

11. The system of claim 10 wherein:

the addressing information of a data line is contained in the first eight wobble cycles of the data line; and the non-addressing information of the data line is contained in the remaining wobble cycles of the data line, the remaining wobble cycles having at least one inverted wobble cycle.

12. The system of claim 8 wherein:

data of the optical disk is arranged in a plurality of data block segments, each data block segment being comprised of a plurality of data lines; and data lines of adjacent data block segments contain different non-addressing information.

13. The system of claim 12 wherein:

each data line is comprised of a plurality of wobble cycles; and the at least one inverted wobble cycle in an non-addressing information portion is in a different position in the non-addressing information portion for data lines of adjacent data block segments.

14. The system of claim 13 wherein the controller:

determines that the addressing information portion of the data line indicates the beginning of a data block segment; and calculates an expected position of the inverted wobble cycle for the particular data block segment using a predetermined function.

* * * * *